United States Patent [19]

Estes

[11] 4,306,962

[45] Dec. 22, 1981

[54] CRYSTALLINE ZEOLITE HP

[75] Inventor: John H. Estes, Wappingers Falls, N.Y.

[73] Assignee: Texaco Inc., White Plains, N.Y.

[21] Appl. No.: 231,819

[22] Filed: Feb. 5, 1981

Related U.S. Application Data

[60] Division of Ser. No. 92,162, Nov. 7, 1979, which is a continuation-in-part of Ser. No. 713,457, Aug. 11, 1976, abandoned.

[51] Int. Cl.$^3$ .............................................. C10G 11/05
[52] U.S. Cl. .............................. 208/120; 252/455 Z; 252/477 R; 423/328
[58] Field of Search .......................................... 208/120

[56] References Cited

U.S. PATENT DOCUMENTS

| | | | |
|---|---|---|---|
| 2,882,244 | 4/1959 | Milton | 423/328 |
| 2,979,381 | 4/1961 | Gottstine et al. | 423/329 |
| 3,140,249 | 7/1964 | Plank et al. | 208/120 |

*Primary Examiner*—Curtis R. Davis
*Assistant Examiner*—G. E. Schmitkons
*Attorney, Agent, or Firm*—Carl G. Ries; Robert A. Kulason; Carl G. Seutter

[57] ABSTRACT

A novel crystalline zeolite composition is prepared by conducting the hydrothermal crystallization and, preferably, a preliminary aging step, at high pressure, i.e. pressures in excess of 20,000 psig (ca 138 MPa) and preferably above about 40,000 psig (ca 276 MPa megaPascals). The crystalline zeolite, designated zeolite HP, has a higher aluminum content than zeolite X and a lattice constant of above about 25.02 A.

8 Claims, 4 Drawing Figures

CRYSTALLINE ZEOLITE HP

RELATED APPLICATION

This is a division of application Ser. No. 92,162 filed Nov. 7, 1979, which is a continuation-in-part application of Ser. No. 713,457 filed Aug. 11, 1976 and now abandoned for Crystalline Zeolite HP—inventor John H. Estes.

BACKGROUND OF THE INVENTION

This invention relates to crystalline aluminosilicates. In particular, it relates to a novel crystalline aluminosilicate and its preparation.

Synthetic crystalline aluminosilicates constitute well known materials which have heretofore been employed as selective adsorbents, supports and catalysts. In general, such crystalline materials have been grown under designated conditions of temperature and time from alkali oxide, aluminum oxide, silica and water precursors. The simplest source materials for preparing the more common crystalline aluminosilicates i.e., the type A, X and Y zeolites, are sodium aluminate, sodium silicate and for the more siliceous X and Y types, an additional source of silicate ions. (The terms crystalline aluminosilicates and zeolites are used herein interchangeably and refer to the same crystalline materials.) Most of the synthesis procedures now in use are tailored to the specific zeolites being prepared.

Crystalline zeolites occur in nature and these natural materials were utilized in early investigation of their crystalline structure. Barrer, one of the early investigators, carried out the synthesis of numerous crystalline aluminosilicates using hydrothermal techniques which comprised introducing the reactant mixture into an autoclave and maintaining the mixture for extended periods of time at elevated temperatures as high as 400°–450° C. Subsequent investigation by others, such as Milton, accelerated the efforts for the commercial production of synthetic crystalline aluminosilicates.

Type A, Type X and Type Y zeolites are among the most useful synthetic crystalline aluminosilicates in use today. The Type A zeolite finds use in gas drying and in one of its particularly preferred embodiments, in an industrial process for separating normal paraffins from hydrocarbon mixtures. The catalytic properties of the Type X and Type Y zeolites have resulted in their commercial use in a variety of industries. By compositing the Type X or Type Y zeolite with an amorphous siliceous matrix, a catalyst is produced which has been found particularly useful in the fluid catalytic cracking of petroleum hydrocarbons.

The composition of typical crystalline zeolites is:

| TYPE OF ZEOLITE | CHEMICAL ANALYSIS |
|---|---|
| A | $Na_{96}[(AlO_2)_{96}(SiO_2)_{96}] \cdot 216H_2O$ |
| X | $Na_{86}[(AlO_2)_{86}(SiO_2)_{106}] \cdot 264H_2O$ |
| Y | $Na_{56}[(AlO_2)_{56}(SiO_2O_{136}] \cdot 250H_2O$ |

Breck and Flanigan in their paper "Synthesis and Properties of Union Carbide Zeolites L, X and Y" present a correlation between the lattice constant of zeolite X and zeolite Y and the number of aluminum atoms in the unit cell. (This paper was read at the conference on molecular sieves held at the University of London on Apr. 4–6, 1967 and published at pages 47–60 of "Molecular Sieves" which is a collection of the papers read at this conference and published by the Society of the Chemical Industry, London, S.W. 1 in 1968). In their paper, these authors describe the unit cell as containing 192 atoms of silicon and aluminum and define the zeolite Y structure as containing less than about 76 aluminum atoms per unit cell and the zeolite X structure as having from about 77 to 96 aluminum atoms. Extrapolation of this correlation shows a lattice constant of 25.02 A, for a zeolite having a 1:1 Si/Al ratio, i.e., 96 aluminum atoms.

Dempsey, Kuhl and Olson, J. Phys. Chem. 73, 387 (1969) present a correlation somewhat different from that of Breck and Flanigan. Their correlation between aluminum contact of the zeolite and lattice constant shows discontinuities in the correlation at specific compositions which they attribute to a high degree of ordering in the lattice at these points. Extrapolation of their data shows a lattice constant of 25.13 A for a 1:1 Si/Al atomic ratio, but the highest lattice constant of a pure zeolite actually actually measured by them was 24.996 corresponding to an $SiO_2:Al_2O_3$ ratio of 2.45. All the tabulated zeolite have a Si:Al atom ratio of above one. The lowest ratio tabulated is (105.8/86.2 or) 1.225; and they refer to the unobtained 1:1 ratio as idealized.

In neither article do the authors present examples for aluminum content per unit cell above 87 atoms. In Breck and Flanigen the upper limit of the data shows a lattice content of 24.95 A. at 86.5 aluminum atoms while Dempsey, Kuhl and Olson show a lattice content of 24.99 A. for 86.2 aluminum atoms. The difference in lattice constant are explained by the different methods of measurement employed.

In these articles there is an implied limit of unit cell composition at a 1:1 ratio of Si to Al atoms because of the so-called "Avoidance Rule" of Lowenstein which says that in aluminosilicate-type structures aluminum ions do not occupy adjacent positions in the lattice. This then limits a Si-Al structure to a 1:1 atomic ratio since a lower ratio would require the aluminum ions to occupy adjacent positions.

A number of procedures have been described for producing synthetic zeolites. These processes require the preparation of aqueous mixtures containing oxides of sodium, silicon and aluminum within certain definite mole ratio limitations. Each process requires that this aqueous mixture be subjected to certain conditions to effect crystallization of the desired zeolite species. My U.S. Pat. No. 2,847,280 discloses the aging of an aqueous mixture of the oxides having certain definite mole ratios at a temperature not above 100° F. (37.8° C.) for at least 8 hours and then hydrotreating the mixture under autogenous pressure at a temperature of 150°–325° F. (65.6°–162.8° C.) to produce zeolite A. U.S. Pat. No. 2,822,243 of Milton discloses another process of producing zeolite A wherein an aqueous mixture of the oxides in specific mole ratios is maintained at 20°–175° C. until crystallization occurs. U.S. Pat. No. 2,982,612 of Barrer et al. discloses still another process of producing zeolite A by maintaining a certain aqueous mixture of oxides at 60°–100° C. to effect crystallization.

Other aqueous oxide mixes produce zeolite X or Y under proper conditions. U.S. Pat. No. 2,882,244 of Milton teaches that certain aqueous oxide mixes will produce zeolite X by maintaining the mix at 20°–110° C. while the mixtures disclosed in U.S. Pat. No. 2,979,381 to Gottstine et al produce the same zeolite species when aged at ambient temperature for at least two hours and maintained at 185°–250° F. (85°–121.1° C.) for at least 1½ hours. The more siliceous aqueous mixtures of oxides disclosed in U.S. Pat. No. 3,130,007 of Breck yield zeolite Y when the mix is digested at ambient temperature for 24–32 hours and then maintained at 90°–105° C. for 25–65 hours.

The aging (digesting) and hydrothermal steps employed in the prior art to prepare synthetic zeolite A, X and Y were conducted under atmospheric or autogenous pressure. In no event were pressures in excess of about 35–50 psig (about 0.2–0.3 MPa) considered as being either necessary or useful in preparing these materials. Neither were the effects of high pressures investigated for any beneficial results which might be obtained when preparing these crystalline aluminosilicates.

New processes for preparing crystalline aluminosilicates including those employing high pressure, might offer significant advantages over processes presently employed, particularly if the crystalline aluminosilicate prepared thereby would have useful properties not found in crystalline aluminosilicates prepared heretofore.

STATEMENT OF THE INVENTION

In accordance with certain of its aspects, this invention is directed to a process for preparing zeolite HP which comprises:

a. forming an aqueous mixture of sodium aluminosilicate having a composition sufficient to establish a ratio of silica atoms to aluminum atoms of between about 0.25 and about 1.0;

b. maintaining said aqueous mixture at hydrothermal conditions including a pressure above 20,000 psig (ca. 138 MPa) and a temperature of 150°–350° F. (65.6°–176.7° C.) for at least three hours; and c. recovering crystalline zeolite comprising zeolite HP as the resulting solid product.

In accordance with certain of its other aspects, this invention is directed to a synthetic crystalline aluminosilicate, zeolite HP, having a lattice constant above above 25.02 A.

BRIEF DESCRIPTION OF THE FIGURES

The present invention will be readily understood by reference to the accompanying figures in which.

DESCRIPTION OF THE INVENTION

Broadly, I have found that the use of high pressure during the synthesis of zeolitic crystalline aluminosilicates produces a zeolite having a structure similar to that of zeolite X but containing more aluminum atoms, having a higher lattice constant than zeolite X and exhibiting properties not found in zeolite X. More particularly, I have found that an aqueous mixture of oxides, which, would under techniques employed by the prior art, produce a zeolite A, will, by the utilization of pressures in excess of 20,000 psig (ca 138 MPa) preferably in excess of 40,000 psig (about 276 MPa) during the hydrothermal portion and the optional aging portion of the synthesis produce a zeolite which may generally be termed an aluminum-rich zeolite X. To distinguish this material from zeolite X prepared heretofore, I have designated this material zeolite HP.

Thus, my invention is directed not only to the process of preparing this zeolite but also to the zeolite itself. Zeolite HP is distinguishable from both zeolite X and zeolite Y, to which it is most closely related in the zeolite family, by having a unit cell which contains more aluminum atoms than possible heretofore and having a lattice constant larger than that reported for zeolite X. Not only does this high aluminum zeolite X differ from other zeolites in its increased ease of ion exchange and depth of exchange but it exhibits novel catalytic and absorptive properties not exhibited heretofore by the prior art zeolites.

Initially, my invention is directed to a process for preparing zeolite HP which comprises:

a. forming an aqueous mixture of sodium aluminosilicate having a composition sufficient to establish ratio of silicon atoms to aluminum atoms of between about 0.25 and about 1.0, b. maintaining said aqueous mixture at a pressure above 20,000 psig (138 MPa), and preferably above about 40,000 psig (ca. 276 MPa) and at a temperature of 150°–350° F. (65.6°–176.7° C.) for at least three hours, and c. recovering zeolite HP as the resulting solid product.

Optionally, and preferably, I find that the quality of the zeolite produced by my process is substantially improved if the aqueous mixture of step (a) is aged at high pressure and about ambient temperatures prior to the hydrothermal crystallization of step (b). The aging step comprises:

aging said aqueous mixture for at least 8 hours at a pressure above 20,000 psig (138 MPa) and preferably above about 40,000 psig (ca. 276 MPa) and a temperature not above about 100° F. (37.8° C.).

In addition, my invention is directed to the zeolite produced by the processes described above. Further, my invention is directed to a synthetic zeolitic crystalline aluminosilicate having a lattice constant above about 25.02 A and a ratio of silicon atoms to aluminum atoms in the unit cell of below 1.0.

In preparing zeolite HP, an aqueous solution of oxides serves as the starting material. This mixture is an aqueous solution of the oxides, $Na_2O$, $Al_2O_3$ and $SiO_2$, or materials whose chemical compositions can be completely represented as mixtures of these oxides, in specified ranges of their mole ratios to produce a mixture wherein the atomic ratio of silicon to aluminum is between about 0.25 and about 1.0. This mixture may also be described as one which when subjected to the zeolitic synthesis preparation techniques of the prior art, including for example, atmospheric or autogenous pressure, would produce zeolite A.

In preparing the aqueous mixture of sodium aluminosilicate for use in my process, any prior art method and formulation used to prepare a zeolite A synthesis mix may be employed provided that the synthesis mixture has a ratio of silicon atoms to aluminum atoms of 0.25 to 1.0. One aqueous mixture which I have found to be particularly useful is disclosed in my U.S. Pat. No. 2,847,280 and is formulated by reacting an aqueous solution of sodium silicate with $CO_2$, $SO_2$, the sodium hydrogen salts of their corresponding acids, (i.e., sodium bicarbonate, sodium bisulfite and sodium hydrosulfide), or mixtures thereof, to form hydrous silica and a by-product sodium salt and then adding sodium aluminate to the mixture in an amount sufficient to establish silicon to aluminum atomic ratio of between about 0.25 and about 1.0. These reactants may be mixed under room temperature conditions and stirred until a thick creamy reaction mixture is formed.

In another embodiment, an aqueous solution of sodium aluminate and sodium hydroxide is combined with an aqueous solution of sodium silicate to produce a mixture in conforming with the atomic ratio range set forth above. This solution is the preferred mixture disclosed in Milton's U.S. Pat. No. 2,882,243 for preparing a zeolite A.

In still another embodiment, a synthesis mixture of sodium aluminosilicate which I find particularly useful in preparing zeolite HP is formulated by mixing together rapidly an aqueous solution of sodium silicate and an aqueous solution of sodium aluminate. Hydrochloric acid is then added with rapid mixing to produce a uniform gel.

Although zeolite HP is produced by utilizing a high pressure hydrothermal treatment of the synthesis mix, as explained above, a purer product is obtained if an aging treatment, also conducted at high pressure, is performed prior to the hydrothermal crystallization step. A method of preparing zeolite HP which includes both high pressure aging and high pressure hydrothermal treatment is therefore a particularly preferred embodiment of my invention.

Following the preparation of the aqueous mixture of oxides, the mixture is, optionally, subjected to aging under high pressure and then hydrothermal treatment under high pressure in order to produce zeolite HP. The pressures that I find necessary are substantially higher than those employed heretofore in the synthesis of zeolitic crystalline aluminosilicates. I have found that at pressures of 20,000–40,000 psig (about 138–about 276 MPa), increasing amounts of zeolite HP are observed in the crystalline product which is a mixture of zeolite A and zeolite HP. I find that pressures in excess of 40,000 psig (about 276 MPa) produce essentially pure zeolite HP, Although pressures far in excess of 40,000 psig (about 276 MPa) may be used to produce zeolite HP, those skilled in the art will appreciate that preparation costs will increase significantly when excessively high pressures are employed. Thus zeolite HP of good quality may be obtained at preparation pressures as high as about 80,000 psig (ca. 552 MPa) but economic considerations hardly justify use of such a preparation pressure. I have found that a pressure of about 50,000 psig (ca. 345 MPa) is particularly useful.

The high operating pressures described above for use in the zeolite synthesis must be maintained during the hydrothermal step of the preparation and during the optional aging step preceding the hydrothermal step. Although it is for operating reasons, usually more convenient to use the same pressure in both steps, this is not critical and the pressures may be different in the aging and hydrothermal treatments provided the pressure in both steps is above 20,000 psig (ca. 138 MPa) and preferably above about 40,000 psig (ca. 276 MPa). Time and temperature are the other operating variables which must be controlled during the zeolite synthesis. Thus, I have found that the high pressure aging should be conducted at about room temperature from 8 to 170 hours., and preferably from 24 to 72 hours at temperatures not substantially above about 100° F., but preferably at about room temperature. The high pressure hydrothermal treatment is conducted by maintaining the mixture at a temperature of about 150°–350° F. (65.6°–162.8° C.) for at least three hours, preferably for 2–24 hours.

The synthesis crystalline aluminosilicate obtained in my high pressure synthesis process has a structure similar to that of zeolite X but possesses many distinguishing characteristics from this commercially available species of zeolite. The lattice content for zeolite HP is significantly higher than that for zeolite X. I have found that lattice constants of above about 25.02 A. are obtained for the zeolites produced in my high pressure synthesis when the atomic ratio of silicon to aluminum in the synthesis mix is between about 0.25 and about 1.0. In fact, the range of lattice constant for zeolite HP appears to be between about 25.02 and about 25.10.

Chemical analysis and ion exchange date of zeolite HP indicate a lower than 1:1 ratio of silicon to aluminum. Because of the "Avoidance Rule", it is unlikely that aluminum ions would occupy adjacent positions in the lattice as required for such a composition. It is possible that the excess aluminum, as alumina, is occluded in the large cages of zeolite HP where it displays ion exchange capability. However, there is no visible evidence of such occlusion in the X-ray studies of this zeolite. The possibility must be considered, therefore, that exceptions to the "Avoidance Rule" may occur at the synthesis conditions employed in synthesizing zeolite HP. If the lattice constants do represent aluminum contents below the 1:1 relationship predicted by the "Avoidance Rule" the fact that a limit is approached at about 25.10 A would indicate that the exception could occur only at favored sites in the lattice.

Zeolite HP has a variety of uses. As obtained in its synthesis, zeolite HP is in its sodium form. This material finds utility after being ion exchanged with various cations such as calcium, potassium and some of the rare earths. Zeolite HP differs from zeolite X in increased ease of ion exchange and depth of exchange. Thus, not only is it easier to replace sodium in zeolite HP by utilizing fewer number of exchanges but the amount of residual sodium remaining after the exchange is substantially less than that obtained with zeolite X. Further, subsequent absorption-desorption steps with zeolite HP show peaks which are much sharper and with less tailing than is obtained with zeolite X. This very high degree of ion exchange permits very high loading of rare earth cations into the zeolite HP structure. Thus, when utilized as a cracking catalyst, high equilibrium activities are readily achieved. When zeolite HP, in its rare earth form, is composited with a siliceous matrix, an improved catalytic cracking catalyst having initial high activity is produced. In its lanthanum exchanged form, zeolite HP may be employed to crack hydrocarbons, such as gas oil, utilizing conventional catalytic cracking conditions.

The following examples serve to illustrate my invention.

DESCRIPTION OF PREFERRED EMBODIMENTS placed in circulating air ovens under thermostatic control.

The results of these tests are set forth in Table I below:

TABLE 1
HIGH PRESSURE PREPARATION OF CRYSTALLINE ZEOLITES

| Run No. | AGING Time hr. | AGING Temp. °F. (°C.) | AGING Press psig (MPa) | HYDROTHERMAL TREATMENT Time hr. | HYDROTHERMAL TREATMENT Temp. °F. (°C.) | HYDROTHERMAL TREATMENT Press psig (MPa) | CRYSTALLINE PRODUCT BASED ON X-RAY ANALYSIS |
|---|---|---|---|---|---|---|---|
| 1* | 20 | Ambient | Atmos. | 16 | 225 | Auto.** | Type A |
| 2 | 20 | Ambient | Atmos. | 6 | 200 (93.3) | 50,000 (ca. 345) | Type A |
| 3 | 20 | 200 (93.3) | 50,000 (ca. 345) | 6 | 200 (93.3) | 50,000 (ca. 345) | (Type HP) |
| 4* | 72 | Ambient | 50,000 (ca. 345) | 16 | 225 (107.2) | Auto. | Type A |
| 5 | — | No Aging | — | 6 | 200 (93.3) | 50,000 (ca. 345) | (Type HP) |

Notes:
*Control
**Autogenous

EXAMPLE I 100 grams of PQ 'N' grade sodium silicate (containing 36.5 wt.% $Na_2Si_4O_9$) were diluted with 120 cc of distilled water to produce a 21.5:1 ratio of water to $SiO_2$. Carbon dioxide, in the form of dry ice, was then added in small quantities and replenished, at such a rate that no large excess was ever present, until a gel formed, at which point the remaining bits of dry ice were removed. Excess $CO_2$ was avoided since it could convert the sodium present to sodium bicarbonate rather than the desired sodium carbonate. The bicarbonate would neutralize a portion of the sodium being added in the next step as sodium aluminate and would interfere with subsequent crystallization. 55 grams of commercial sodium aluminate, containing 95 wt.% $2 NaAlO_2.3H_2O$, was dissolved in water to produce about a 30:1 mole ratio of $(SiO_2+Al_2O_3):H_2O$ and in an amount sufficient to produce about a 1:1 ratio of silicon to aluminum atoms when added to the gelled mixture. The aqueous solution of sodium aluminate was added to the gel with rapid mixing to produce a smooth creamy mixture after about 10 minutes of stirring. The mixture approximates the mixtures disclosed in my U.S. Pat. No. 2,847,280 which upon subsequent aging at room temperature and hydrothermal treatment at autogenous pressures and elevated temperature produced zeolite A.

To evaluate the effect of high pressure on zeolite crystal formation the creamy mixture was divided into five portions. One portion served as a control and was subjected to aging at atmospheric pressure and hydrothermal treatment at 225° F. (107.2° C.) and autogenous pressure. The remaining four portions were subjected to various combinations of aging at atmospheric or elevated pressure and hydrothermal treatment at autogenous pressure or elevated pressure. In all instances the elevated pressure was 50,000 psig (about 345 MPa). The high pressure studies were run in a reaction vessel constructed of Inconel having a 347 stainless steel liner and a working cavity of approximately 1¾ inch ID×26 inches. Synthesis mixes in 347 stainless steel vessels were placed in the working cavity and subjected to elevated pressures and temperatures. Mixes subjected to elevated temperatures and autogenous pressures were placed in screw capped 316 stainless steel vessels having a 200 cc capacity. The screw capped vessels were then placed in circulating air ovens under thermostatic control.

An additional run, Run 6, was made to determine the stability of a NaA zeolite (Type 4 A zeolite manufactured by Linde). A quantity of commercial Type 4 A manufactured by the Linde Company together with some water was charged the reaction vessel which was then pressured to 50,000 psig (ca 345 MPa) and heated to 200° F. (93.3° C.) for 24 hours. The type 4 A sieves were recovered unchanged.

In each of the five runs a crystalline zeolite product was obtained. Run 1* approximates the procedure disclosed in my U.S. Pat. No. 2,847,280. As expected, when the aging and hydrothermal treatments were conducted under the moderate conditions of the prior art, zeolite A was prepared. Since the aging portion of the procedure is believed to result in nucleation of the favorite species for the particular composition of a synthesis mix, it was not surprising that the exceedingly high pressure utilized during the hydrothermal treatment of Run 2 did not produce other than zeolite A. Run 3, on the other hand, employed high pressures of 50,000 psig (ca. 345 MPa) in both the aging and the hydrothermal treatment and produced a zeolite type which was not expected—a zeolite HP similar to zeolite X but having an unusually high aluminum content. Run 4* shows that carrying out the hydrothermal operation at atmospheric pressure produces a Type A zeolite (rather than a zeolite HP) even when the aging operation is carried out at 50,000 psig. To produce a zeolite HP, if the preliminary aging step is employed, the pressure therein must be above about 20,000 psig and preferably above about 40,000 psig. Run 5 was conducted with no aging but a hydrothermal treatment at high pressure. Although a zeolite HP was produced in Run 5, it was of a visibly poorer quality (basis X-ray) than that which was obtained in Run 3 because of the absence of aging.

The material from Run 3 was subjected to further examination under X-ray diffraction. Calculations using this X-ray data showed the X type material from Run 3 had a lattice constant, $a_o$, of 25.04±0.01 Å. This is very close to the predicted value of 25.02 Å by Breck & Flanigan for a Type X zeolite with a 1:1 Si to Al ratio. Chemical analysis of the Run 3 product gave a ratio of Si to Al of 1.16:1; however, this analysis did not distinguish between zeolite and any amorphous material which may have been present. The synthesis mix used in these runs had a Si to Al ratio of 0.96:1.

The results of Run 3 were confirmed by repeating this run with identical results being obtained in terms of the zeolite type. The lattice constant for the crystalline zeolites obtained from these runs, Runs 7 and 9, was:

|  | A |
|---|---|
| Run 7 | 25.06 ± 0.01 |
| Run 8 | 25.04 ± 0.01 |

EXAMPLE II 200 grams PQN grade sodium silicate (36.5 wt.% $Na_2Si_4O_9$) was diluted to 400 cc with distilled water. 282 grams of Nalco #2 stabilized sodium aluminate ($Na_2O/Al_2O_3 = 1.45/1$) was diluted to 400 cc with distilled water. The two solutions were mixed rapidly to obtain a uniform consistency. Then 42 cc of commercial concentrated hydrochloric acid (12 N) diluted to 100 cc were added and the mixture blended until uniform. The gel had a Si/Al atom ratio of 0.79. The gel was charged to the high pressure vessel, aged for 20 hours at room temperature under 50,000 psig (ca. 345 MPa) hydrostatic pressure, then heated to 200° F. (93.3° C.) for 6 hours. A zeolite product was collected by filtration and washed with one liter of distilled water. The product yield was 134 grams. X-ray diffraction measurements showed that the zeolite had a lattice constant of 25.07 A.

EXAMPLE III

Comparisons of the high pressure zeolite of Run 3 with Type X and Type Y zeolite were made.

Structure determinations of the zeolites were based on X-ray powder patterns. These tests were used both for identification and determination of lattice constants.

The data published by Breck and Flanigan show a correlation between lattice constant and the number of aluminum atoms in the unit cell of the Type X and Y class of zeolites in the hydrated form.

Lattice constant determinations are carried out by measuring selected lines in the back reflection region of the X-ray pattern. Normally the lattice constant given is an average value for the $a_o$ from the lines measured. X-ray measurements were made on the zeolite from Run 3 and commercially available Type X zeolite. The results are presented in Table II below. The first set of data was obtained from the same Miller indices while the second set of data utilized different line identifications. The d value is the actual spacing between parallel planes of the crystal.

TABLE II

Lattice Constant, $a_o$, Data Based On X-Ray Powder Patterns (a) Based on same lines Back Reflection line ident

| | Run 3 Zeolite HP | | Type X Zeolite | |
|---|---|---|---|---|
| Miller Indices | d value | $a_o$ | d value | $a_o$ |
| 25, 5, 1 | 0.9826 | 25.07 | 0.9795 | 24.99 |
| 24, 6, 2 | 1.0095 | 25.06 | 1.0267 | 24.99 |
| 24, 2, 2 | 1.0367 | 25.06 | 1.0339 | 24.99 |

(b) Based on different lines

| Miller Indices | d value | $a_o$ | Miller Indices | d value | $a_o$ |
|---|---|---|---|---|---|
| 26, 6, 4 | 0.9293 | 25.07 | 26, 8, 4 | 0.9088 | 24.99 |
| 26, 4, 2 | 0.9505 | 25.07 | 26, 4, 4 | 0.9395 | 25.00 |

The zeolite of Run 3 obtained under high pressure and from an aluminum-rich synthesis mixture exhibits a lattice constant as high as 25.07. This represents an aluminum richness in the zeolite of nearly 10% if the lattice constant correlations of Breck and Flanigan are accepted. Such a composition is supported by chemical analysis of the Run 3 zeolite HP zeolite whose typical abalysis is as follows:

Si/Al ratio, calculated from X-ray 92/104
Si/Al ratio, chemical analysis 93/103

Chemical analysis also showed the following oxide composition for the sodium form of the Run 3 zeolite HP.

| | Mole % |
|---|---|
| $Na_2O$ | 21.7 |
| $Al_2O_3$ | 37.8 |
| $SiO_2$ | 40.1 |

EXAMPLE IV

To further investigate the effect of pressure during the aging and hydrothermal synthesis steps of crystalline aluminosilicate formation, a series of runs was made wherein the pressure was studied over a range of 15,000–50,000 psig (about 103 to 345 MPa). The synthesis mix compositions were prepared as in Example I. Synthesis mixture A had a Si/Al atom ratio of 0.96/1. Synthesis mixture B had a Si/Al of 0.87/1. In each run the same high pressure was maintained during the aging and the hydrothermal steps and each synthesis mixture was investigated during each run. Further, a control was run simultaneously with each high pressure study. Thus, each run consisted of four parts: (i) A high pressure synthesis of mixture A; (ii) a control employing mixture A and (iii) a high pressure run with mixture B; and (iv) a control employing mixture B. Four pressure levels were investigated 15,000, 30,000, 40,000 and 50,000 psig (ca. 103, 207, 276 and 345 MPa) with repeat runs for the 40,000 and 50,000 psig (ca. 276 and 345 MPa) tests. The product from each run was analyzed by X-ray techniques to identify the type of zeolite obtained. The results of runs 9 to 14 are presented in Table III below:

TABLE III

PRESSURE EXPERIMENTS

| | Aging | | Synthesis | | Product Identification (X-ray) Type Zeolite | |
|---|---|---|---|---|---|---|
| Run No. | Press psig (MPa) | Temp | Press | Temp, °F. (°C.) | Synthesis Mixture A[1] | Synthesis Mixture B[2] |
| 9 | 15,000 (c a. 103) | Rm | 15,000 (c a. 103) | 200 (93.3) | A | A |
| Control | Atm. | Rm | Auto | 225 (107.2) | A | A + Amor. |

TABLE III-continued
PRESSURE EXPERIMENTS

| | Press | | Aging | | Product Identification (X-ray) Type Zeolite | |
|---|---|---|---|---|---|---|
| | | | Synthesis | | Synthesis | Synthesis |
| Run No. | psig (MPa) | Temp | Press | Temp, °F. (°C.) | Mixture A[(1)] | Mixture B[(2)] |
| 10 | 30,000 (c a. 207) | Rm | 30,000 (c a. 207) | 200 (93.3) | A (tr HP) | A |
| Control | Atm | Rm | Auto | 225 (107.2) | A | A |
| 11 | 40,000 (c a. 276) | Rm | 40,000 (ca. 276) | 200 (93.3) | A, HP | A, HP |
| Control | Atm | Rm | Auto | 225 (107.2) | A | A |
| 12 | 50,000 (c a. 345) | Rm | 50,000 (c a. 345) | 200 (93.3) | HP, $a_o$ = 25.04 | HP, $a_o$ = 25.07 |
| Control | Atm | Rm | Auto | 225 (107.2) | A | A |
| 13 | 40,000 (c a. 276) | Rm | 40,000 (c a. 276) | 200 (93.3) | A, HP | A, HP |
| Control | Atm | Rm | Auto | 225 (107.2) | A | A |
| 14 | 50,000 (c a. 345) | Rm | 50,000 (c a. 345) | 200 (93.3) | HP, $a_o$ = 25.04 | HP, $a_o$ = 25.06 |
| Control | Atm | Rm | Auto | 225 (107.3) | A | A |

Notes:
[(1)]Synthesis Mixture A — Si/Al = 0.98/1
[(2)]Synthesis Mixture B — Si/Al = 0.87/1

From Table III, it will be apparent that at synthesis (or hydrothermal operation) pressures below 20,000 psig (note Run 9 for example at 15,000 psig), the synthesis mixture contains zeolite A with no zeolite HP. At pressures at and above 20,000 psig (note Run 10, for example at 30,000 psig), the synthesis mixture contains zeolite A with increasing amounts of zeolite HP. At pressure at or above the preferred lower limit of 40,000 psig (note Runs 11 and 13 for example at 40,000 psig), zeolite HP is formed. At the preferred pressure of 50,000 psig (note Runs 11 and 14 for example), the product mix may consist essentially of zeolite HP. In all the control runs, the product was zeolite A, also containing in one instance amorphous material.

EXAMPLE V

A number of runs were made to study the effect of the silicon to aluminum ratio. The atom ratio was varied from 0.32/1 to 1.14/1. In Runs 23 and 24 the desired ratio was obtained by additions of sodium orthosilicate. In each run the aging was conducted at 50,000 psig (ca. 345 MPa) and room temperature for 20 hours while the hydrothermal step was conducted at 50,000 psig (ca. 345 MPa) at 200° F. (93.3° C.) for six hours. A control was run on each synthesis mixture wherein the aging was conducted at atmospheric pressure and the hydrothermal synthesis at autogenous pressures and 225° F. (107.2° C.). The product obtained from each high pressure run and control was identified for zeolite type by X-ray. The results are presented in Table IV below.

TABLE IV
EFFECT OF CHANGES IN Al/Si RATIO OF SYNTHESIS MIXTURES

Test Conditions: Aging-50,000 psig (ca. 345 MPa), Rm. Temp. 20 Hrs. Synthesis-50,000 psig (ca. 345 MPa), 200° F. (93.3° C.)
Control: Aging-Atm Press, Synthesis-Autogenous Pressure, 225° F. (107.2° C.)

| Run No. | Preparation | Si/Al Atomic Ratio* | Product Identification (X-ray) Zeolite Type |
|---|---|---|---|
| 15 | Pressure | 0.98/1 | HP $a_o$ = 25.04 ± 0.01 |
| | Control | 0.98/1 | A |
| 16 | Pressure | 0.87/1 | HP, $a_o$ = 25.07 ± 0.01 |
| | Control | 0.87/1 | A |
| 17 | Pressure | 0.87/1 | HP, $a_o$ = 25.06 ± 0.01 |
| | Control | 0.87/1 | A |
| 18 | Pressure | 0.98/1 | HP, $a_o$ = 25.04 ± 0.01 |
| | Control | 0.98/1 | A |
| 19 | Pressure | 0.56/1 | HP (tr A), $a_o$ = 25.00 ± 0.01 |
| | Control | 0.56/1 | A |
| 20 | Pressure | 0.32/1 | HP (tr A) weak diffuse X-ray line |
| | Control | 0.32/1 | A |
| 21 | Pressure | 1.49/1 | X - diffuse X-ray line |
| | Control | 1.49/1 | X, $a_o$ = 24.87 |
| 22 | Pressure | 1.16/1 | X, $a_o$ = 24.99 ± 0.01 |
| | Control | 1.16/1 | 80% X, 20% A |
| 23 | Pressure | 1.05/1 | Very weak X |
| | Control | 1.05/1 | Weak X, Phillipsite |
| 24 | Pressure | 1.14/1 | Good X, $a_o$ = 24.87 ± 0.01 |
| | Control | 1.14/1 | Mod Weak X; St'd X |

*in the synthesis mix

From Table IV, it will be apparent that it is readily possible by practice of the process of this invention to prepare zeolite HP characterized by a lattice constant of 25.04 Å to 25.07 Å, having a Si/Al ratio below 1. The control examples show that use of reaction conditions outside the scope of this invention do not give such a product.

EXAMPLE VI

A sample of the high aluminum zeolite (zeolite HP) prepared by the process of this invention and having a lattice constant of 25.06±0.01 (a portion of the material prepared in Run No. 7) was subjected to absorption tests together with a standard sample of zeolite X obtained from the Linde Company. Adsorptions of these two zeolites were determined and compared using a dual column chromatograph. Slurries of the two zeolites were adsorbed on Chromasorb P give a 1:3 ratio of zeolite to packing in the two columns. A flow of helium was passed through each column while it was heated to an elevated temperature. Then a quantity of an adsorbable material was introduced into the helium and the adsorption characteristics of each of the zeolites studies. The results obtained are presented in Table IV below.

The general adsorption characteristics of the zeolite HP and the zeolite X appear to be about the same with the major difference lying in the ease of desorption. The zeolite HP desorbed more quickly with the desorption peaks visibly demonstrating less tailing, i.e., a cleaner desorption. The exclusion by both sieves of perfluoro tributyl amine indicates that the pore openings are larger than 10 A., since this material is a standard one for measuring maximum pore openings of this size.

TABLE V
ABSORPTION DATA - HIGH PRESSURE ZEOLITE

| Compound | Temp °C. | Column I - Zeolite HP Behavior | Time | Column II - Zeolite X Behavior | Time |
|---|---|---|---|---|---|
| In Flow of He | | | | | |
| Benzene | 350 | Desorb Peak | 10 Min | Desorb Peak | 25 Min |
| Decahydronaphthalene | 350 | Desorb Peak | 24 Min | Desorb Peak | 50 Min |
| Diphenylmethane | 350 | Not Desorb | 26 Min | Not Desorb | 26 |
| Triisopropylbenzene | 300 | Not Desorb | 24 | Not Desorb | 24 |
|  | 350 | Not Desorb | 16 | Not Desorb | 20 |
| $(C_4F_9)_3N$ | 350 | Desorb with Air Peak | | Desorb with Air Peak | |
|  | 350 | Desorb with Air Peak | | Desorb with Air Peak | |

EXAMPLE VII

The ion exchange characteristics of zeolite HP were studied and compared with the ion exchange properties of a standard zeolite X using the same concentration of exchange solutions and the same number of exchanges. The properties of the two zeolites were as follows:

TABLE VI
ZEOLITE PROPERTIES

|  | Zeolite HP | Zeolite X |
|---|---|---|
| Lattice Constant, $a_o$ | 25.06 ± 0.01A | 24.95 ± 0.04 |
| Si/Al Ratio, X ray | 0.92/1 | 1.09/1 |
| Si/Al, Ratio Chem | 0.96/1 | 1.12/1 |

Each zeolite was exchanged using calcium, potassium, and lanthanum salts. Each was compared for degree of exchange and correspondence of the X ray patterns of the exchanged materials to X-ray pattern standards.

The calcium exchange utilized calcium formate as the exchange salt. Twenty five grams of the air equilibrated zeolites were treated with 200 ml of a 1.0 normal solution of the salt for 30 minutes at 160° F. for each exchange. A total of five exchanges was carried out. The zeolites were washed with 500 ml of distilled water between exchanges and with 1000 ml after the final exchange. Finally the samples were washed with 100 ml of acetone and air dried.

X-ray patterns of both products corresponded with that of a known Ca X zeolite except for small line shifts. Chemical analyses revealed that the zeolite HP was exchanged to greater extent than the zeolite X. These data are:

|  | % $Na_2O$ | % CaO | % $SiO_2$ | % $Al_2O_3$ | Si/Al Ratio |
|---|---|---|---|---|---|
| Zeolite HP | 0.1 | 18.5 | 41.4 | 37.6 | 0.93 |
| Zeolite X | 1.2 | 15.5 | 46.2 | 32.4 | 1.20 |

From these data, it is clear that the zeolite HP of this invention was unexpectedly characterized by a much deeper (18.5/15.5 or 120%) calcium exchange than the zeolite X.

A second experiment using only three exchanges reduced the sodium (as sodium oxide) in the zeolite HP to 0.9 weight percent, a degree of exchange superior to the zeolite X under the first set of exchange conditions using five exchanges.

The potassium exchange was conducted in a similar manner using the chloride as the exchange salt. The results of these exchanges are as follows:

|  | % $Na_2O$ | % $K_2O$ | Si/Al Ratio |
|---|---|---|---|
| Zeolite HP | 1.03 | 25.7 | 0.96 |
| Zeolite X | 1.3 | 21.6 | 1.15 |

Again the zeolite HP shows a higher degree of exchange for equivalent treatment by a factor of 25.7/21.6 or 120%.

The lanthanum exchange used the nitrate as the exchange salt and followed the exchange procedures recommended in Linde Molecular Sieves Technical Bulletin "Ion Exchange and Metal Loading Procedure". As with the previous two experiments there was a significant difference in depth of exchange (of about the same magnitude) for a given set of conditions.

Analytical data for the lanthanum exchanged zeolites are:

|  | % $Na_2O$ | % $La_2O_3$ | Si/Al Ratio |
|---|---|---|---|
| Zeolite HP | 0.5 | 32.2 | 0.98 |
| Zeolite X | 1.2 | 28.4 | 1.18 |

Zeolite HP differs from zeolite X in increased ease of ion exchange and depth of exchange.

EXAMPLE VIII

A number of synthesis mixes having various atom ratios of Al to Si were prepared in a manner similar to that of Example II to develop a phase diagram to show the distribution of zeolitic species in the $Na_2O$-$SiO_2$-$Al_2O_3$ system where the hydrothermal treatment to effect crystallization was conducted at 50,000 psig (ca. 345 MPa) and 200° F. (93.3° C.). The resultant species included conventional X, zeolite HP as well as other known species obtained in prior art synthesis processes. The phase diagram obtained is presented in FIG. 1. The data points are indicated by circles on this triangular plot. Lattice constant measurements for some of the zeolites were obtained and are noted in FIG. 1 adjacent to the data points.

Figure 1:
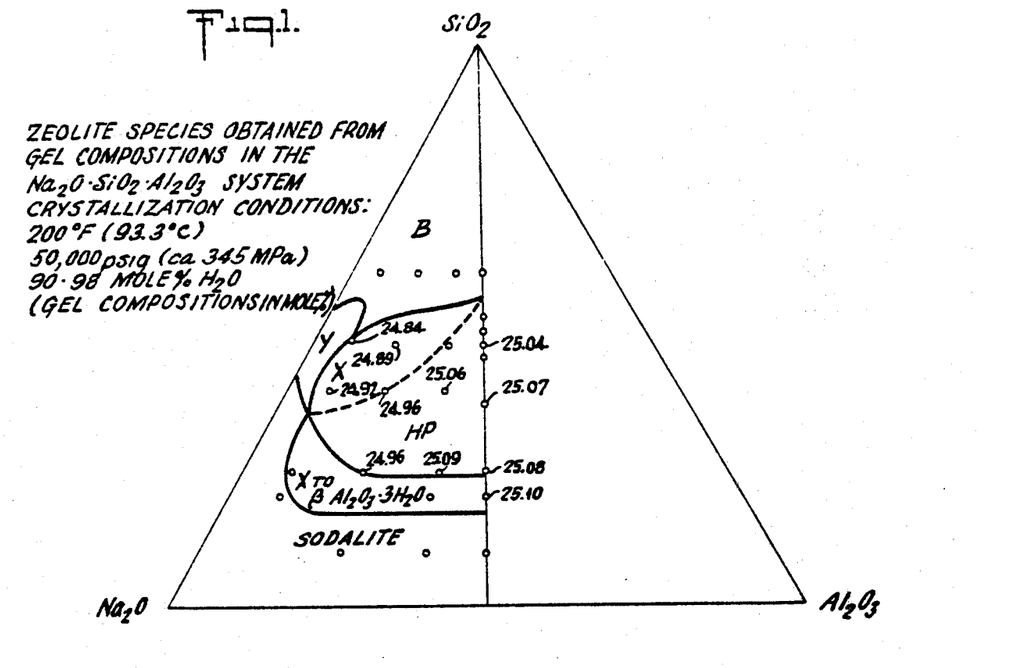
FIG. 1 presents the phase diagram of the zeolite species in the $Na_2O$-$SiO_2$-$Al_2O_3$ system when the crystallization conditions are 200° F. (93.3° C.) and 50,000 psig (ca. 345 MPa).
Figure 2:
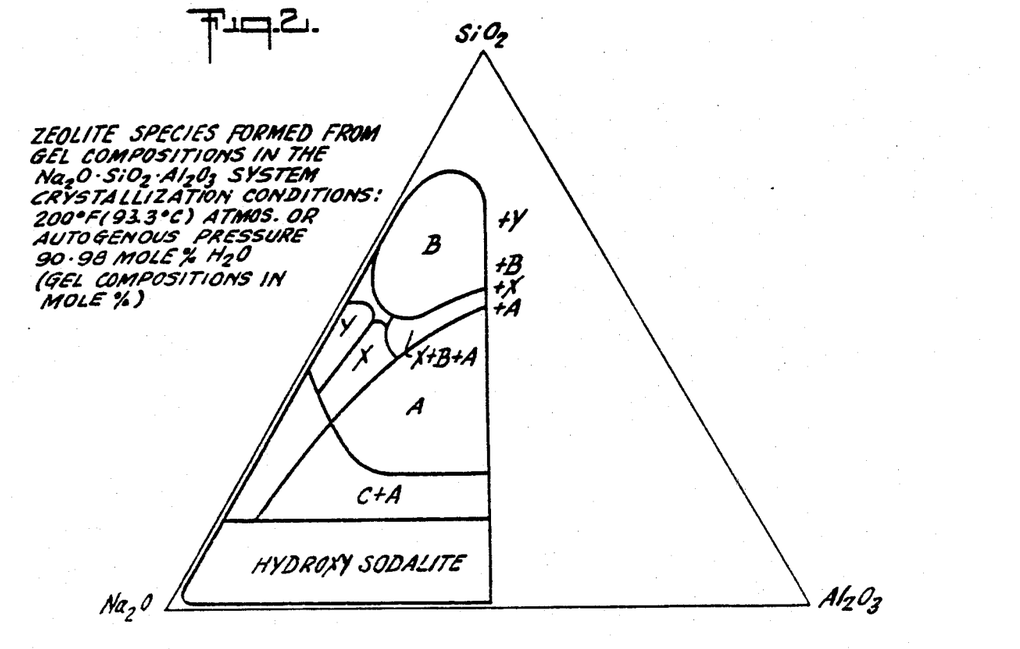
FIG. 2 presents the phase diagram of Breck and Flanigan for the zeolite species in the $Na_2O$-$SiO_2$-$Al_2O_3$ system when the crystallization conditions are 200° F. (93.3° C.) and atmospheric or autogenous pressure.

FIG. 1 bears a striking resemblance to the zeolite phase diagram presented in FIG. 2 which shows the phase diagram for zeolites obtained when the crystallization is performed at atmospheric or autogenous pressure and 200° F. (93.3° C.). The most significant difference is that there is no zeolite A species in the phase diagram of FIG. 1 where the high pressure crystallization of my process is employed. It appears that the area occupied by zeolite A in FIG. 2, appears as zeolite HP in FIG. 1. The line between zeolite X and zeolite HP FIG. 1 is dotted since its exact location has not been determined. Thus the data point evidencing a lattice constant of 24.96 is identified as zeolite X indicating that the transition line may well be located below this point.

EXAMPLES IX-X-XI

Figure 3:
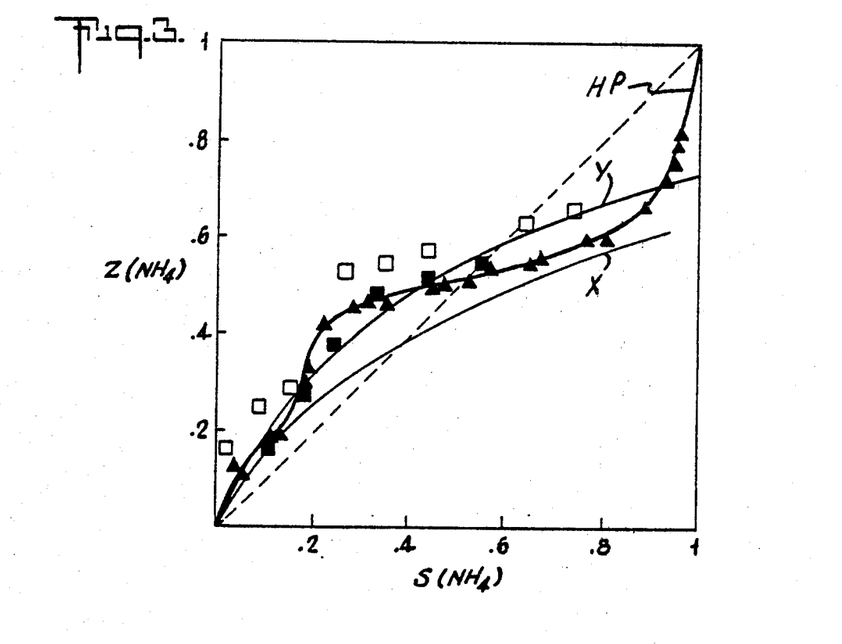
FIG. 3 represents exchange adsorption isotherms showing (for zeolites X, Y, and HP) the concentration of ammonium ion in zeolite as a function of the concentration of ammonium ion in aqueous solution-as the ammonium ion replaces the sodium ion originally present in the zeolite.

In order to further characterize the zeolite HP products of the instant invention, ion exchange absorption isotherms were developed. In each of a series of experiments, the $NH_4^+$-$Na^+$ exchange isotherm was measured for zeolite X (Example IX*), zeolite Y (Example X*), and the zeolite HP of this invention (Example XI). Each zeolite, in sodium form, was immersed in a solution which contained a predetermined concentration of ammonium ions and the system was permitted to stand at 20° C. until equilibrium was attained. $NH_4^+$ ion adsorbed on the zeolite (replacing the Na+ ion) was determined before and after equilibrium.

These isotherms have been plotted in standard manner in FIG. 3. For each run, there is plotted as the abscissa, or horizontal axis, the equivalent fraction of ingoing ion contained in the solution per total ion exchange capacity of the zeolite. The ordinate shows the equivalent fraction of ingoing ions per total ion exchange capacity of the zeolite. As will be apparent to those skilled in the art, if the solution contains an amount in moles, of $NH_4^+$ ions equal to the amount of Na+ ions in the zeolite (i.e. $S_{NH4}$ is 1) and the measured amount, in moles, of $NH_4^+$ ions in the zeolite after equilibrium were found to be one-half of the amount of Na+ ion originally present (i.e. $Z_{NH4}$ is 0.5). Then this would correspond to a point on the exchange isotherm having the value (1, 0.5).

FIG. 3 shows the exchange isotherm for an $NH_4^+$-$Na^+$ exchange on conventional zeolite X (Example IX*) and zeolite Y (Example X*), which are typical of those reported in the literature. From FIG. 3, it may be noted that the maximum amount of $NH_4^+$ ion which may be exchanged into zeolite X is about 0.65, i.e. for every 100 Na+ ions originally present, only about 65% have been replaced by $NH_4^+$ ions. Similarly for the zeolite Y, only about 75% of the Na+ ions have been replaced by $NH_4^+$ ions.

FIG. 3 also shows the exchange isotherm for $NH_4^+$-$Na^+$ on the zeolite HP of this invention. It will be noted that the right end of the isotherm shows 100% exchange i.e. for every 100 Na+ ions originally present, the exchanged zeolite will contain 100 $NH_4^+$ ions and no Na+ ions.

Prior to exchange with $NH_4^+$, the zeolite HP sample was equilibrated with excess sodium nitrate solution (and washed with methanol) to minimize Na+ deficiency. The black triangles and black squares represent duplicate experiments in which $NH_4^+$ was analyzed by micro-Kjehldahl.

Comparable results are attained when the zeolite HP, in its K+ form, is exchanged against $NH_4^+$.

From the above curves of FIG. 3, it will be apparent that the zeolite HP is characterized by certain features which are completely different from zeolites X or Y:

(i) the sudden increase in selectivity between $S_{NH4}$ of 0.2 and 0.3 in the case of zeolite HP is unlike anything observed in the case of zeolite X and Y; (ii) the overall configuration of the adsorption isotherm for zeolite HP is significantly different from the curves for zeolite X and Y;

(iii) at any given point in the curve, the isotherm for zeolite HP and thus the exchange level, is superior to that of zeolite X;

(iv) the isotherm for zeolite HP clearly targets at 100% exchange capacity whereas the isotherms of zeolite X and Y level off at about 65% and 75%.

It will also be noted that in FIG. 3, the zeolite HP isotherm is developed from black squares and black triangles which represent duplicate analyses of $NH_4^+$ found in the zeolite HP. The open squares represent Na+ these data being obtained by use of a $^{22}Na$ label. Thus it is apparent that at any given value of S, more sodium is displaced than is equivalent to the ammonium introduced. The difference between these values represents exchange into the zeolite HP of H+ ions and this is reflected in the fact that the pH of the solution increases from 5.8 up to 7.5 during the exchange.

This proton exchange phenomenon is of a totally different magnitude from anything which has been reported for zeolites X and Y.

It has also been found that $La^{+++}$ ions may be exchanged 100% into zeolite HP although $La^{+++}$ ions may only be exchanged into zeolite X up to about 75% and into zeolite X up to about 85%. It is also interesting to note that for $NH_4^+$ ion exchange, the sequence of maximum exchange in HP>Y>X while for $La^{+++}$ exchange, the sequence is HP>X>Y. At low equivalent concentrations however the sequence for lanthanum is X>Y>HP.

The novel zeolite HP of this invention is also characterized by the presence of a number of aluminum ions in the unit cell which is outside the range of values found for zeolites X, Y, and A.

| Zeolite | Aluminum ions per unit cell |
|---|---|
| A | 96 |
| X | 77–96, eg 86 |
| Y | 48–76, eg 56 |
| HP | above 96, and typically 97–103, eg 97 |

The lattice constant of the HP so characterized is above about 25.02 Å (i.e. 25.02±0.005 Å).

The novel zeolite is also characterized by the presence of water molecules in fixed locations in the zeolite HP saturated with potassium ions; and thus it can be detected by X-ray (localized). The unusual location of water molecules in zeolite HP is probably due to the high concentration of cations in the large cavities. No water molecules are observable by X-ray in either the potassium forms of zeolite X or zeolite Y because the water is too mobile to be located.

Another unexpected feature of the novel zeolite is the symmetrical shape of the LF (low frequency) hydroxyl band, this symmetry being absent from the spectra of the zeolite X or zeolite Y.

Zeolite HP has a strong tendency to be Na+ deficient. This zeolite HP appears to be a weak acid with a high affinity for protons, a property which undoubtedly contributes to its catalytic activity. Although the cation deficiency is less pronounced with K+, it is present.

The affinity of the zeolite HP for $NH_4^+$ is very pronounced at low $NH_4^+$ content of the exchange solution. All the isotherms observed contain an inflection at low exchange levels which has not heretofore been observed in previous experiments on zeolite X or Y.

Zeolite HP is particularly characterized by the fact that as prepared, it typically has a crystallite size of about 0.1–0.3 microns. Conventional zeolite X and Y are typically recovered in crystals having a size of about 3–10 microns.

This new zeolite HP which is prepared by hydrothermal treatment above 20,000 psig, and preferably above about 40,000 psig may be seen to be characterized by properties which are totally different from those of prior art zeolites. The preparative optional step of aging (prior to hydrothermal treatment) if employed is carried out at pressure above 20,000 psig and preferably above about 40,000 psig. It is frequently found to be convenient to carry out both steps at the same pressure, preferably above about 40,000 psig as this permits attainment of substantially pure zeolite HP.

As the pressure of hydrothermal treating is increased above 20,000 psig, increasing amounts of zeolite HP are found in the zeolite A. As the pressure increases above 40,000 psig, the product contains zeolite HP in higher purity.

EXAMPLES XII-XIII-XIV

Figure 4:
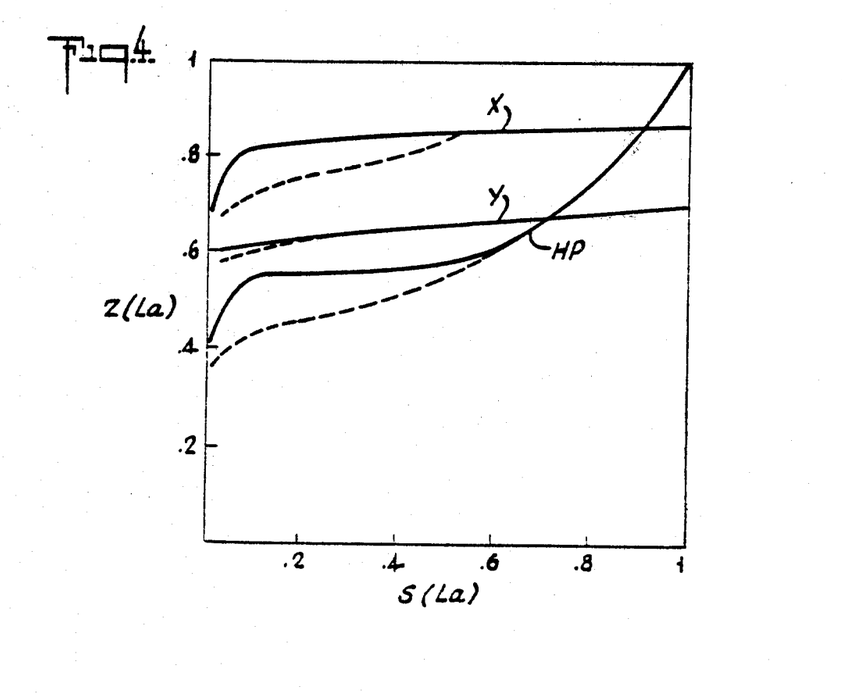
FIG. 4 presents exchange adsorption isotherms for the $La^{+++}$-$Na^+$ exchange in zeolite X, zeolite Y, and zeolite HP systems.

In order to further characterize the zeolite HP of this invention, rare-earth exchange adsorption isotherms were developed. In each of a series of experiments, the $La^{+++}$-$Na^+$ exchange isotherm was measured for zeolite X (Example XII), zeolite Y (Example XIII), and the zeolite HP of this invention (Example XIV). Each zeolite in $Na^+$ form was immersed in a solution which contained a predetermined concentration of lanthanum $La^{+++}$ ions; and the system was permitted to stand at 20° C. until equilibrium was attained. $La^{+++}$ ion adsorbed on the zeolite (replacing the $Na^+$ ion) was determined before and after equilibrium.

For each measurement, a determination was made of the content of $Na^+$ in the solution in the zeolite and of the $La^{+++}$ in the solution and in the zeolite. These isotherms are plotted in standard manner in FIG. 4.

In the case of each curve, the left end is split. The upper portion of the split curve is plotted based upon the $Na^+$ determination; and the lower portion of the split curve is plotted based upon the $La^{+++}$ determination.

From FIG. 4, it will be apparent that when subjected to $La^{+++}$ exchange, the zeolite HP of this invention again permits attainment of 100% exchange while the zeolite X levels out at only ca. 85% and the zeolite Y levels out at only 65%.

It will also be apparent that the configuration of the zeolite HP isotherm is totally unlike that observed for the zeolites X and Y.

EXAMPLE XV

In another Example, the procedure of Example II is followed using 41.8 grams of PQN grade of sodium silicate and 198.3 grams of Nalco #2 freshly prepared stabilized sodium aluminate, diluted to 450 cc with distilled water. Hydrochloric acid (Conc.) is employed in amount of 40.1 cc. The gel composition has a Si:Al atom ratio of 1:4 i.e. 0.25:1.

The product zeolite HP is found to have a lattice constant $a_o$ of 25.10 Å.

On chemical analysis, the zeolite HP is found to contain 11.2% $Na_2O$, 66.2% $Al_2O_3$, and 22.6% $SiO_2$, an analysis which indicates the presence of substantial amorphous alumina.

Generally it will be observed that zeolite HP products having a lattice constant approaching 25.10 Å are found to be contaminated with either beta alumina.3-$H_2O$ or with other zeolite species.

Although this invention has been illustrated by reference to specific embodiments, it will be apparent to those skilled in the art that various changes and modifications may be made which clearly fall within the scope of this invention.

I claim:

1. A hydrocarbon conversion process which comprises contacting a hydrocarbon charge under catalytic cracking conditions with a synthetic crystalline aluminosilicate, zeolite HP, having a lattice constant above about 25.02 A and an atom ratio of Si to Al in the unit cell below 1.0.

2. A hydrocarbon conversion process which comprises contacting a hydrocarbon charge under catalytic cracking conditions with the synthetic crystalline aluminosilicate, zeolite HP, said zeolite HP having been prepared by a process which comprises:
   (a) forming an aqueous mixture of sodium aluminosilicate having a composition sufficient to establish a ratio of silicon atoms to aluminum atoms of between about 0.25 and about 1.0;
   (b) maintaining said aqueous mixture at a pressure above 20,000 psig (ca. 138 MPa) and a temperature of 150°–350° F. (65.6°–176.7° C.) for at least three hours thereby forming crystalline zeolite comprising zeolite HP; and
   (c) recovering said crystalline comprising zeolite HP.

3. A hydrocarbon conversion process as claimed in claim 2 wherein the pressure of step (b) is above 40,000 psig (ca. 345 MPa).

4. A hydrocarbon conversion process as claimed in claim 2 including the following additional step subsequent to step (a) and prior to step (b):
   (d) aging said aqueous mixture of step (a) for at least 8 hours at a pressure above 20,000 psig (ca. 276 MPa) and a temperature not above 100° F. (37.8° C.).

5. A hydrocarbon conversion process under catalytic cracking conditions with the composition as claimed in claim 4 wherein the pressure of step (d) is about 50,000 psig (ca. 345 MPa).

6. A hydrocarbon conversion process as claimed in claim 2 wherein the zeolite HP is in its rare earth cation form.

7. A hydrocarbon conversion process as claimed in claim 6 wherein the zeolite HP is composited with a siliceous matrix.

8. A hydrocarbon conversion process according to claim 6 wherein the rare earth cation is lanthanum.

* * * * *

UNITED STATES PATENT AND TRADEMARK OFFICE
CERTIFICATE OF CORRECTION

PATENT NO. : 4,306,962
DATED : December 22, 1981
INVENTOR(S) : John H. Estes

It is certified that error appears in the above—identified patent and that said Letters Patent is hereby corrected as shown below:

Col. 1, line 59, correct the formula to read

-- $Na_{56}[(AlO_2)_{56}(SiO_2)_{136}] \cdot 250\ H_2O$ --

Col. 2, line 14, cancel "contact", insert -- content --;

Col. 2, line 31, correct the spelling of "differences";

Col. 3, line 42, cancel "above", insert -- about --;

Col. 3, line 56, cancel "represents", insert -- presents --;

Col. 6, line 17, correct the spelling of "synthetic", line 28, correct the spelling of "data";

Col. 9, line 6, cancel "9", insert -- 8 --;

Col. 10, line 22, correct the spelling of "analysis";

Col. 16, line 24, cancel "in", insert -- is --.

Signed and Sealed this

Thirteenth Day of April 1982

[SEAL]

Attest:

*Attesting Officer*

GERALD J. MOSSINGHOFF

*Commissioner of Patents and Trademarks*